United States Patent [19]

Mac Leay et al.

[11] 3,928,493
[45] Dec. 23, 1975

[54] CURING AND POLYMERIZATION PROCESSES INITIATED BY TERTIARY-ALIPHATIC-ALPHA-(IMIDO)-AZO COMPOUNDS

[75] Inventors: Ronald Edward Mac Leay, Williamsville; Harold Carl Lange, Grand Island; Chester Stephen Sheppard, Tonawanda, all of N.Y.

[73] Assignee: Pennwalt Corporation, Philadelphia, Pa.

[22] Filed: Mar. 5, 1974

[21] Appl. No.: 448,420

Related U.S. Application Data

[60] Division of Ser. No. 88,120, Nov. 9, 1970, Pat. No. 3,812,094, which is a continuation-in-part of Ser. No. 725,180, April 29, 1968, abandoned, which is a continuation-in-part of Ser. No. 616,158, Feb. 15, 1967, abandoned, which is a continuation-in-part of Ser. No. 409,306, Nov. 5, 1964, abandoned.

[52] U.S. Cl. ........ 260/864; 260/2.5 AV; 260/2.5 P; 260/2.5 H; 250/2.5 HA; 260/2.5 HB; 260/88.3 R; 260/88.7 D; 260/89.3; 260/89.5 R; 260/89.5 A; 260/91.5; 260/92.8 R; 260/93.5 R; 260/94.6; 260/94.9 CA; 260/152
[51] Int. Cl.² .................... C08F 4/04; C08F 110/02; C08L 67/06
[58] Field of Search.............. 260/864, 89.3, 89.5 R, 260/89.5 A, 89.5 N, 91.3 R, 94.6, 93.5 R, 92.8, 94.9, 88.3, 88.7, 91.5

[56] References Cited
UNITED STATES PATENTS

| | | | |
|---|---|---|---|
| 3,282,912 | 11/1966 | Benzing | 260/158 |
| 3,367,994 | 2/1968 | Parker | 260/864 |
| 3,755,443 | 8/1973 | Sheppard et al. | 260/864 |

Primary Examiner—Murray Tillman
Assistant Examiner—J. Ziegler
Attorney, Agent, or Firm—Charles E. Feeny

[57] ABSTRACT

Novel t-aliphatic α-(imido) azo compounds:

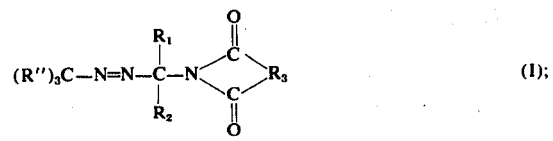

processes for preparing I by reacting t-aliphatic α-(chloro) azo compounds:

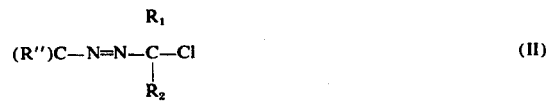

with salts or salt solutions of imides; and the use of compounds I as polymerization initiators for vinyl monomers and as curing agents for resins. For example, 2-t-butylazo-2-phthalimidopropane is prepared by reacting potassium phthalimide and 2-t-butylazo-2-chloropropane; and the product is used to cure an unsaturated polyester/styrene resin at 115°C. and to polymerize styrene at 115°C.

7 Claims, No Drawings

CURING AND POLYMERIZATION PROCESSES INITIATED BY TERTIARY-ALIPHATIC-ALPHA-(IMIDO)-AZO COMPOUNDS

CROSS-REFERENCE TO RELATED APPLICATIONS

This is a division of application Ser. No. 88,120, filed Nov. 9, 1970, now U.S. Pat. No. 3,812,094 which in turn is a continuation-in-part of Ser. No. 725,180 filed Apr. 29, 1968(now abandoned), which in turn is a continuation-in-part of Ser. No. 616,158 filed Feb. 15, 1967 (now abandoned), which in turn is a continuation-in-part of Ser. No. 409,306 filed November 5, 1964 (now abandoned).

BACKGROUND OF THE INVENTION

This invention relates to novel t-aliphatic $\alpha$-(imido) azo compounds (I); to processes for preparing I from t-aliphatic $\alpha$-(chloro) azo compounds (II); and to the use of I as polymerization initiators for vinyl monomers and as curing agents for polyester resin compositions.

To the best of applicants' knowledge, no $\alpha$-imido derivatives of t-aliphatic azo compounds (I) have been previously reported. While Canadian Patent No. 750,380 and U.S. Pat. No. 3,282,912 report synthesis of some $\alpha$-substituted azo compounds, none of the substituents are imido compounds.

BRIEF SUMMARY OF THE INVENTION

This invention is directed to:

A. novel t-aliphatic ("t"=tertiary) azo compounds containing an $\alpha$-imido group of the formula:

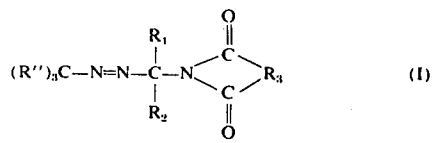

where:

$(R'')_3C$ is a $C_4$ to $C_{20}$ t-alkyl, cycloalkyl, alkylcycloalkyl, arylcycloalkyl or aralkyl radical where $R''$ is a $C_1$ to $C_8$ alkyl, $C_7$ to $C_{12}$ aralkyl or $C_6$ to $C_{14}$ aryl radical, not more than one $R''$ being aromatic, and where 2 or 3 of said $R''$s can join with the tertiary carbon atom to form a $C_3$ to $C_{12}$ cyclo, bicyclo or tricyclo radical;

$R_1$ and $R_2$ are separately selected from a $C_1$ to $C_8$ alkyl, $C_3$ to $C_{12}$ cyclo-, bicyclo- or tricycloalkyl, $C_7$ to $C_{12}$ aralkyl and 5 to 6 membered heterocyclic radical, $R_1$ can also be a $C_6$ to $C_{14}$ aryl radical, $R_1$ and $R_2$ taken together can form a $C_3$ to $C_{11}$ alkylene diradical, and one or more of each of $R_1$ and $R_2$ can be substituted with radicals selected from lower alkoxy, hydroxy, carboxy, alkoxycarbonyl, acyloxy, halogen, cyano, amido and alkylsulfonato; and $R_3$ is a $C_2$ to $C_{10}$ alkylene or alkenylene, $C_3$–$C_{10}$ cycloalkenylene, cyclo- or bicycloalkylene or substituted cyclo- or bicycloalkylene, or $C_6$ to $C_{14}$ arylene or substituted arylene ("-ene" being used herein to designate biradicals are opposed to unsaturation);

B. A method for preparing the novel I compounds by reacting t-aliphatic $\alpha$-(chloro) azo compounds of the formula

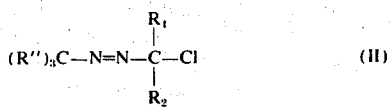

with salts or salt solutions of imides of the formula

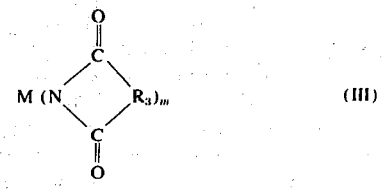

where

M is alkali metal (for example, sodium or potassium) or alkaline earth metal (e.g., calcium or barium);

$m$ is the valence of M (1 or 2); and $(R'')_3C$, $R_1$, $R_2$ and $R_3$ are as defined above;

C. The use of I as polymerization initiators (free radical generators) for the homo- or copolymerization of ethylenically unsaturated monomers which are responsive at suitable temperatures to free radical generators, especially for initiating styrene polymerizations in the temperature range of about 85°– 130° C., and preferably in the 100°–115° C. range, depending on the $(R'')_3C$, $R_1$ and $R_2$ radicals; and D. The use of I as curing agents (free radical initiators) for the curing of unsaturated polyester resin compositions in the presence of I, especially for curing unsaturated polyester-vinyl monomer blends at temperatures of about 80°–145° C., and preferably 100°–130° C., again depending on the $(R'')_3C$, $R_1$ and $R_2$ groups.

The substituted cycloalkylene and arylene $R_3$ groups may contain various non-interfering substituents such as halogen, cyano, amino, amido, sulfo, lower alkyl and the like.

DETAILED DESCRIPTION OF INVENTION

Process

Preparation of the above described intermediate t-aliphatic $\alpha$-(chloro) azo compounds (II) is described in application Ser. No. 725,180, filed Apr. 29, 1968, now abandoned.

II and III are preferably reacted in approximately equal molar equivalents and the reaction should be run in inert solvents. Preferably the solvents should be miscible with water and capable of at least partially dissolving the metal salt of the imide. Examples of such solvents are acetone, dimethylsulfoxide, dimethylformamide and t-butanol. Water itself is a good reaction medium, however the yields are generally improved by using aqueous solutions of the above mentioned solvents. Methanol, ethanol, propanol and isopropanol are poor solvents for this reaction because they are capable of reacting with the $\alpha$-chloroazo compound to form the $\alpha$-alkoxyazo compound and thereby lower the yield and purity of the desired product. The reaction can be run at about 0° – 90° C., but preferably is run at 20° –50° C. to obtain a reasonable reaction rate and a minimum of decomposition. The $\alpha$-chloroazo compound is preferably added at a moderate rate to a slurry or solution of the imide salt. The $\alpha$-chloroazo compound can be added neat or in a solution of an inert solvent such as ethers, hydrocarbons, chlorinated hydrocarbons, dimethylsulfoxide, dimethylformamide or t-butanol. The imide salt may be prepared and isolated before adding it to the reaction medium or it may be prepared in situ by adding approximately an equivalent amount of a strong inorganic base such as the alkali metal or alkaline earth hydroxides, preferably the more economic hydroxides such as sodium or potassium are used, to a solution (or slurry) of the imide. It is also preferable to have a slight excess of the imide over the alkali hydroxide and a slight excess of the imide salt over the α-chloroazo compound. The reaction period generally varies from one-half hour to 4 hours depending on the choice of solvent and the reaction temperature. The reaction product is isolated by diluting the reaction mixture with water and separating (or extracting) the organic layer.

Utility

These new compounds are free radical generators, polymerization initiators for vinyl monomers, curing agents for polyester resins, initiators for free radical initiated chemical reactions, blowing agents for producing foamed polymers and plastics, selective oxidizing agents and generators of reactant free radicals.

It has been observed that these new compounds are initiators for the polymerization or copolymerization of unsaturated monomers such as alkenes, vinyl halides, vinyl esters, vinylidene halides and alkenyl aromatics.

Illustrative polymerizable monomers are ethylene, vinyl chloride, vinylidene chloride, vinyl acetate, vinylpyridine, vinylpyrrolidone, vinylcarbazole, butadiene, isoprene, acrylonitrile, acrylic acid, acrylic acid esters, methacrylic acid, methacrylic acid esters, styrene, chlorostyrene and methylstyrenes.

These compounds are very efficient curing agents of polyester resins in the 80° to 145° C. temperature range.

Unsaturated polyesters which are used as the one component of the polyester resin compositions according to the present invention are, for instance, polyesters as they are obtained by esterifying preferably ethylenically unsaturated di- or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2′-dihydroxy ethyl ether); triethylene glycol; ethylene glycol bis-(2-hydroxy ethyl ether); propanediol-1,2;butanediol-1,3; 2,2-dimethyl propanediol-1,3; butene (2)-diol-1,4,- glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, hydrophthalic acid, and others and their anhydrides such as phthalic anhydride. The acids used as well as the alcohols employed may be substituted by other substituents, preferably by halogen. Examples of suitable halogenated acids are, for instance, tetrachloro phthalic acid; 1,4,5,6,7,7-hexachloro bicyclo(2,2,1) heptene (5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate, ethyl acrylate, and others, which are copolymerizable with said polyesters.

A preferred resin composition contains as the polyester component the esterification product of propylene glycol (a polyalcohol), maleic anhydride (anhydride of an unsaturated dicarboxylic acid) and phthalic anhydride (anhydride of an aromatic dicarboxylic acid) and as the monomer component styrene.

The novel I compounds evolve one mole of nitrogen gas per azo group in the compound when they are decomposed. In addition, other gases are evolved from the breakdown and/or disproportionation of the radicals formed. Thus the novel I compounds are useful in applications where copious quantities of gasses are desired such as in producing foamed polymers.

Compounds

Many novel compounds (I) of the present invention are taught in the examples to follow. Additional compounds which can be prepared according to this invention include:

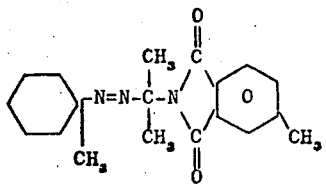

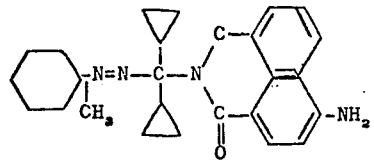

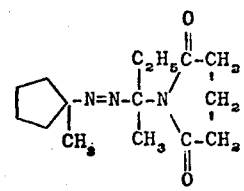

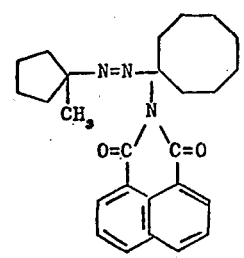

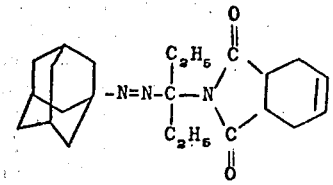

5
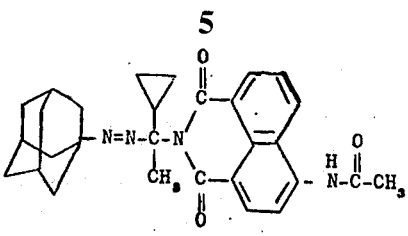
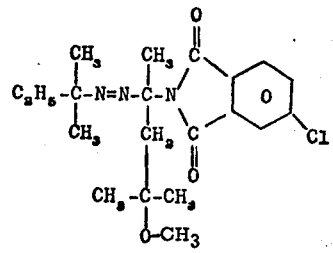
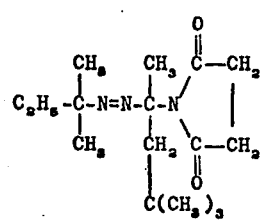
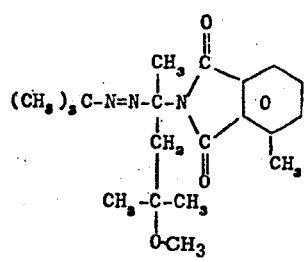
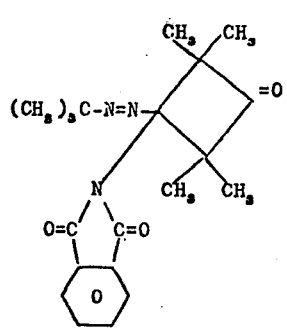
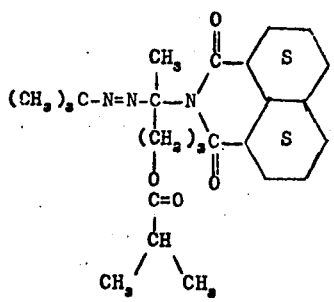
6
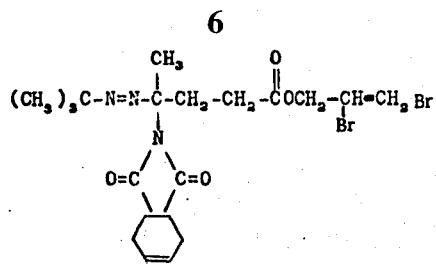
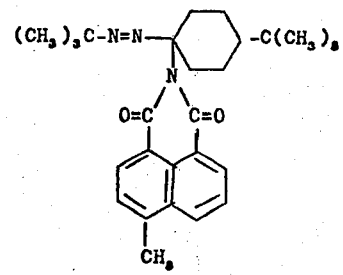
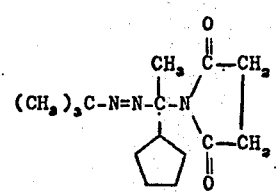
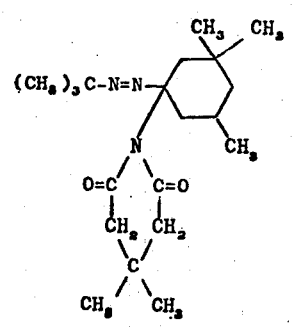
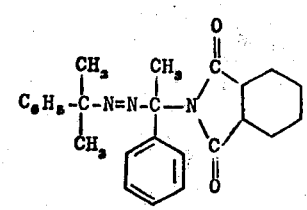
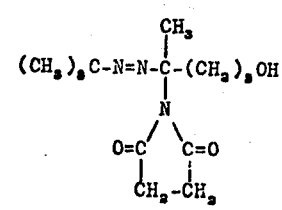

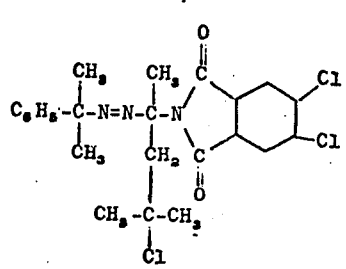
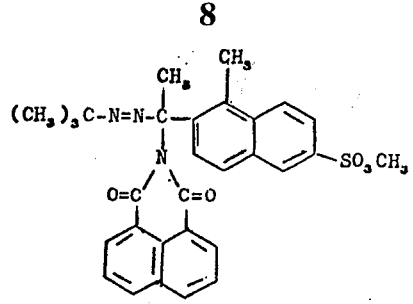
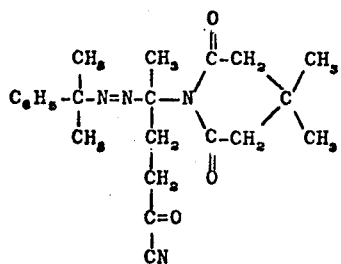
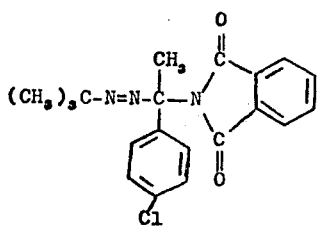
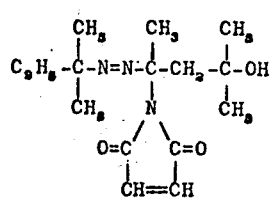
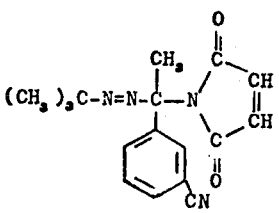
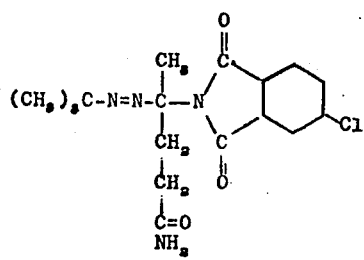
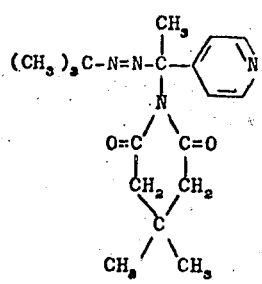
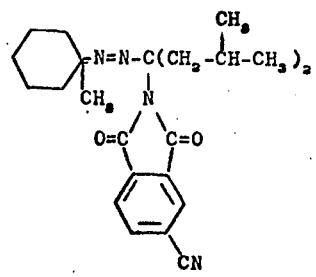
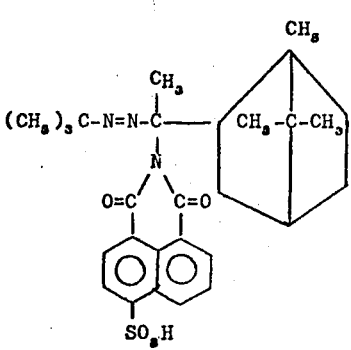
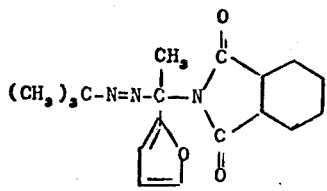
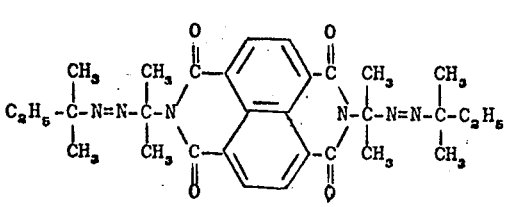

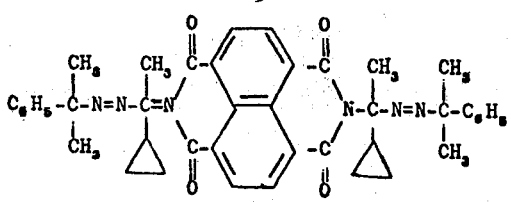

Further compounds which can likewise be prepared include those where the (R'')₃C- group in the above compounds is replaced by:

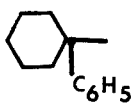 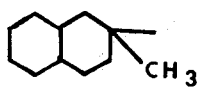 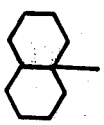 or

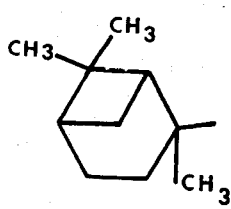

EXAMPLES

The following examples illustrate the invention but are not in limitation thereof.

EXAMPLE I

Preparation of
2-t-Butylazo-2-phthalimido-4-methylpentane

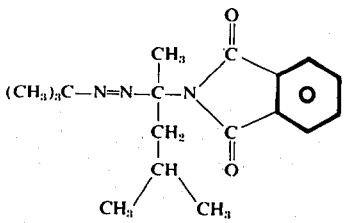

To a stirred room temperature solution of 5.55 grams (0.03 moles) of potassium phthalimide in 80 ml. of 75% aqueous acetone, was added 6.15 grams (0.03 moles) of 2-t-butylazo-2-chloro-4-methylpentane dropwise over a 15 minute period. After the addition was complete, the reaction was stirred an additional 15 minutes, poured into 2000 mls. of water and the product extracted with 200 mls. of pentane. The pentane layer was separated, washed with water, 10% NaHCO₃ solution, water, dried over anhydrous sodium sulfate, filtered, stirred over alumina, filtered and the pentane evaporated under reduced pressure to leave 6.4 grams (68% yield) of a light yellow liquid. The infrared spectrum of the product was in agreement with the structure of 2-t-butylazo-2-phthalimido-4-methylpentane.

2-t-Butylazo-2-phthalimido-4-methylpentane was determined to have a ten hour half-life in trichlorobenzene at 116°C by the standard gas evolution technique.

EXAMPLE II

Curing an Unsaturated Polyester-Styrene Resin with
2-t-Butylazo-2-phthalimido-4-methylpentane An unsaturated polyester resin was made by reacting maleic anhydride (1.0 mole), phthalic anhydride (1.0 mole), and propylene glycol (2.2 moles) until an acid number of 45–50 was obtained. To this was added hydroquinone at a 0.013% concentration. Seven parts of this unsaturated polyester was diluted with 3 parts of monomeric styrene to obtain a homogeneous blend having a viscosity of 13.08 poise and a specific gravity of 1.14.

To 20 grams of this blend was added 0.2 grams of 2-t-butylazo-2-phthalimido-4-methylpentane (from Example I) and the mixture stirred up well with a wooden spatula, poured into a test tube and the test tube placed in a constant temperature bath at 115°C. The internal temperature was recorded as a function of time and a peak exotherm of 405°F (207°C) was reached in 3.4 minutes indicating an excellent cure of the unsaturated polyester-styrene blend had occurred. The resultant cured materials was very hard.

Without an initiator, no cure of this resin blend occurred even after more than 30 minutes at 115°C.

EXAMPLE III

Polymerization of Styrene with
2-t-Butylazo-2-phthalimido-4-methylpentane

A series of pyrex test tubes was filled with styrene solutions containing varying amounts of 2-t-butylazo-2-phthalimido-4-methylpentane. The amounts of azo initiator in the tubes were adjusted so that the resulting conversion versus concentration plots would cross 98.5% conversion, ideally, after 8.5 hours at 115°C. (The 98.5% conversion figure was selected since styrene polymerizations are carried out almost to complete conversion commercially. Hence initiators that dead-end after 90% conversion and before 98.5% conversion or achieve 98.5% conversion after using very large quantities of initiator are not attractive commercially). After flushing out the tubes with nitrogen gas, they were sealed and placed in a constant temperature bath thermostatted at 115°C. After 8.5 hours at 115°C the tubes were removed and quickly chilled to 0°C to prevent post polymerization. The sealed tubes were then broken and the polymer dissolved in 100 ml. of benzene. The resulting solution was poured into 1000 ml. of methanol to precipitate the polystyrene. The polymer was separated by filtration and dried in an oven at 50°–55°C. The conversion of styrene to polymer was then determined and plots of initiator concentration versus conversion was constructed. The initiator concentration required to attain 98.5% conversion (or thereabout) was compared under similar conditions, to that of di-t-butylperoxide. [Di-t-butylperoxide and t-butyl peroxybenzoate (used for efficiency comparisons in Examples IV, VI and IX) are known initiators for styrene polymerizations.] Equation (1) was used to determine efficiency data.

$$F_1/F_2 = Rp_1{}^2/Rp_2{}^2 \times Kd_2/Kd_1 \times [I]_2/[I]_1 \qquad (1)$$

$F_1/F_2$ is the efficiency of the 2-t-butyazo-2-phthalimido-4-methylpentane compared to that of di-t-butylperoxide ($F_2$); $Rp_1$ and $Rp_2$ are rates of polymerization of the azo initiator, and di-t-butylperoxide, respectively; $Kd_1$ and $Kd_2$ are decomposition rate constants for the azo initiator and di-t-butylperoxide, respectively; and $[I]_1$ and $[I]_2$ are concentrations of azo initiator and di-t-butylperoxide, respectively, required for attainment of 98.5% conversion after 8.5 hours at 115°C. Under these conditions:

$$Rp_1{}^2/Rp_2{}^2 = 1$$

We also know $Kd_2/Kd_1$ from the half-lives of di-t-butylperoxide and the azo initiator, respectively. Hence the value of $F_1/F_2$ can be calculated and in the case of 2-t-butylazo-2-phthalimido-4-methylpentane $F_1/F_2$ was determined to be 1.05. Therefore 2-t-butylazo-2-phthalimido-4-methylpentane is a very efficient initiator for styrene polymerizations.

EXAMPLE IV

Preparation of 2-t-Butylazo-2-phthalimido-4-methoxy-4-methylpentane

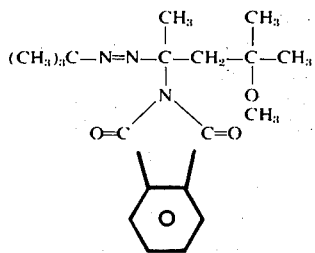

To a solution of 7.91 grams (0.12 moles) of 85% potassium hydroxide in 100 ml. of 70% aqueous t-butanol, was added 19.1 grams (0.13 moles) of phthalimide and the mixture stirred until the phthalimide dissolved. The solution was cooled to 20°C and with rapid stirring 23.45 grams (0.1 moles) of 2-t-butylazo-2-chloro-4-methoxy-4-methylpentane was added slowly, holding the reaction temperature at approximately 20°C with a water bath. After the addition was complete, the reaction was stirred an additional 1 hour, poured into 1000 mls. of water and the product extracted with 200 mls. of pentane. The pentane layer was separated, washed with 100 ml. of water, 10% NaHCO₃ solution, dried over anhydrous sodium sulfate, filtered, stirred over alumina, filtered and the pentane evaporated under reduced pressure to leave 17.1 grams (50% yield) of a light semisolid. The crude product was recrystallized from pentane to give a white crystalline product, m.p. 55°–57°C. The infrared spectrum of the product was in agreement with the structure of 2-t-butylazo-2-phthalimido-4-methoxy-4-methylpentane.

2-t-Butylazo-2-phthalimido-4-methoxy-4-methylpentane was determined to have a ten hour half-life in trichlorobenzene at 101°C by the standard gas evolution technique.

At a 1.0 weight percent loading the 2-t-butylazo-2-phthalimido-4-methoxy-4-methylpentane cured the unsaturated polyesterstyrene resin of Example II at 115°C giving a peak exotherm of 445°F (229°C) in 5.4 minutes and a very hard cured resin.

The styrene polymerization efficiency ($F_1/F_2$) for 2-t-butylazo-2-phthalimido-4-methoxy-4-methylpentane at 100°C compared to t-butyl peroxybenzoate was determined as 0.69 using the same procedure described in Example III.

EXAMPLE V

Preparation of 1-t-Butylazo-1-phthalimidocyclohexane

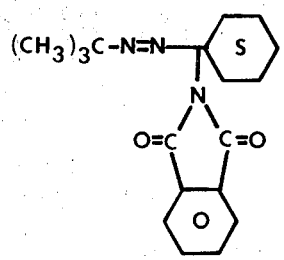

To a solution of 7.35 grams (.05 moles) of phthalimide in 50 ml. of dimethylformamide in a 200 ml. beaker, was added dropwise and with stirring 3.6 grams (.045 moles) of 50% sodium hydroxide. After the addition was complete, the reaction mixture was stirred for 20 minutes at room temperature and 8.11 grams (.04 moles) of 1-t-butylazo-1-chlorocyclohexane added dropwise over 15 minutes holding the temperature at 30°–35°C. After the addition was complete, the reaction mixture was stirred for 3 hours at 30°C, poured into 300 ml. of cold water and the white solid which formed was filtered off and dried. The crude product contained some unreacted phthalimide so it was slurried in pentane and filtered to remove the insoluble phthalimide and the pentane evaporated under reduced pressure to leave 10.4 grams (83% yield) of a white solid, which had a melting point of 95°–98°C after recrystallization from pentane at low temperatures.

The infrared spectrum of the product was in agreement with the structure of 1-t-butylazo-1-phthalimidocyclohexane. The ten hour half-life of this compound was determined as 139°C by the standard gas evolution technique.

At a 1.0 weight percent loading the 1-t-butylazo-1-phthalimidocyclohexane cured the unsaturated polyester-styrene resin of Example II at 130°C giving a peak exotherm of 414°F (213°C) in 7.5 minutes and a hard cured resin.

The styrene polymerization efficiency ($F_1/F_2$) for 1-t-butylazo-1-phthalimidocyclohexane at 115°C compared to di-t-butylperoxide was determined as 1.08 using the same procedure described in Example III.

EXAMPLE VI

Preparation of 2-t-Butylazo-2-phthalimidopropane

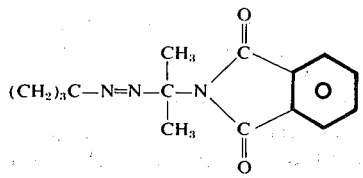

To a 40°C slurry of 7.22 grams (.039 moles) of potassium phthalimide in 80 ml. of dimethylformamide in a 250 ml. 4 neck round bottom flask equipped with a magnetic stirrer, thermometer and addition funnel, was added 5.96 grams (.0367 moles) of 2-t-butylazo-2-chloropropane dropwise over 25 minutes holding the temperature at 40°C with a warm water bath. After the addition was complete, the reaction was stirred for 35 minutes at room temperature, poured into 250 ml. of cold water and the product extracted with pentane. The pentane solution was separated, washed with water, dried over anhydrous sodium sulfate, filtered and the pentane evaporated under reduced pressure to leave 7.5 grams (75% yield) of a light yellow liquid which partially crystallized on standing. A sample was recrystallized from pentane at dry ice temperatures to give a white solid, m.p. 37°–40°C.

The infrared spectrum of the product was in agreement with the structure of 2-t-butylazo-2-phthalimidopropane. The ten hour half life in trichlorobenzene of this compound was determined as 127°C by the standard gas evolution technique.

At a 1.0 weight percent loading the 2-t-butylazo-2-phthalimidopropane cured the unsaturated polyester-styrene resin of Example II at 115°C giving a peak exotherm of 378°F (192°C) in 10.1 minutes and a hard cured resin.

The styrene polymerization efficiency ($F_1/F_2$) for 2-t-butylazo-2-phthalimidopropane at 115°C compared to t-butyl peroxybenzoate was determined as 0.62 using the same procedure described in Example III.

EXAMPLE VII

Preparation of Ethyl 3-t-Butylazo-3-phthalimidobutyrate

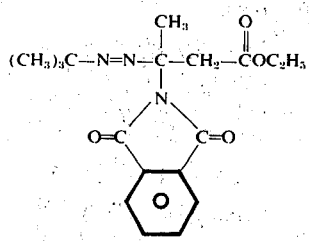

To a 40°C slurry of 5.72 grams (.031 moles) of potassium phthalimide in 80 ml. of dimethylformamide in a 200 ml. beaker, was added 6.8 grams (0.029 moles) of ethyl 3-t-butylazo-3-chlorobutyrate dropwise and with rapid stirring over a 20 minute period. After the addition was complete, the reaction was stirred for 30 minutes at room temperature, poured into 200 ml. of cold water and the product extracted with pentane. The pentane solution was separated, washed with water, dried over anhydrous sodium sulfate and the pentane evaporated under reduced pressure to leave 5.0 grams (50% yield) of a light yellow liquid.

The infrared spectrum of the product was in agreement with the structure of ethyl 3-t-butylazo-3-phthalimidobutyrate.

EXAMPLE VIII

Preparation of 2-t-Butylazo-2-succinimido-4-methylpentane

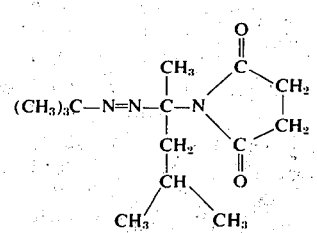

To a solution of 2.5 grams (0.038 moles) of 85% potassium hydroxide in 10 ml. of water in a 100 ml. beaker, was added 3.86 grams (.039 moles) of succinimide and the reaction mixture stirred for 15 minutes. To this solution was added 7.67 grams (0.0376 moles) of 2-t-butylazo-2-chloro-4-methylpentane over 20 minutes at room temperature. After the addition was complete, the reaction was stirred for 4 hours at room temperature, poured into 100 ml. of cold water and the product estracted with pentane. The pentane solution was washed with water, dried over anhydrous sodium sulfate, filtered and the pentane evaporated under reduced pressure to leave 4.0 grams (40% yield) of a straw yellow liquid.

The infrared spectrum of the product was in agreement with the structure of 2-t-butylazo-2-succinimido-4-methylpentane. The ten hour half-life in trichlorobenzene of this compound was determined as 120°C by the standard gas evolution technique.

At a 1.0 weight percent loading the 2-t-butylazo-2-succinimido-4-methylpentane cured the unsaturated polyesterstyrene resin of Example II at 115°C giving a peak exotherm of 406°F (208°C) in 7.1 minutes and a very hard cured resin.

The styrene polymerization efficiency ($F_1/F_2$) for 2-t-butylazo-2-succinimido-4-methylpentane at 115°C compared to di-t-butylperoxide was determined as 1.13 using the same procedure described in Example III.

EXAMPLE IX

Preparation of 2-t-Butylazo-2-succinimido-4-methoxy-4-methylpentane

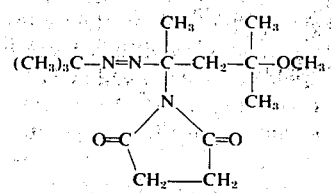

To a solution of 25.8 grams (.26 moles) of succinimide in 100 ml. of dimethylformamide in a 400 ml. beaker, was slowly added 20.4 grams (.255 moles) of 50% sodium hydroxide and the reaction mixture stirred for 30 minutes at room temperature. To the above mixture was added with rapid stirring 58.6 grams (.25 moles) of 2-t-butylazo-2-chloro-4-methoxy-4-methylpentane over a 30 minute period holding the temperature at 20°–25°C with a water bath. After the addition was complete, the reaction was stirred for 1 hour at room temperature, poured into 500 ml. of ice cold water and extracted with pentane. The pentane solution was separated, washed with water, saturated NaHCO₃ solution, water, dried over anhydrous sodium sulfate, filtered and the pentane evaporated under reduced pressure to leave 48.2 grams (65% yield) of a straw yellow liquid.

The infrared spectrum of the product was in agreement with the structure of 2-t-butylazo-2-succinimido-4-methoxy-4-methylpentane. The ten hour half-life in trichlorobenzene of this compound was determined as 103°C by the standard gas evolution technique.

At a 1.0 weight percent loading the 2-t-butylazo-2-succinimido-4-methoxy-4-methylpentane cured the unsaturated polyester-styrene resin of Example II at 100°C giving a peak exotherm of 372°F (188°C) in 4.2 minutes and a very hard cured resin.

The styrene polymerization efficiency ($F_1/F_2$) for 2-t-butylazo-2-succinimido-4-methoxy-4-methylpentane at 100°C compared to t-butyl peroxybenzoate was determined as 0.83 using the same procedure described in Example III.

EXAMPLE X

Preparation of 1-t-Butylazo-1-succinimidocyclohexane

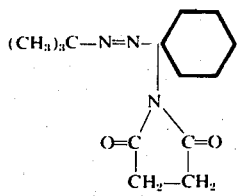

To a solution of 3.86 grams (0.039 moles) of succinimide in 50 mls. of dimethylformamide in a 200 ml. beaker, was slowly added 3.04 grams (0.038 moles) of 50% sodium hydroxide and the reaction mixture stirred for 15 minutes at room temperature. The reaction mixture was then warmed to 40°C and with rapid stirring 7.65 grams (0.0377 moles) of 1-t-butylazo-1-chlorocyclohexane added dropwise, holding the temperature at 40°–45°C with a water bath. After the addition was complete, the reaction was stirred for an additional 30 minutes at room temperature, poured into 200 ml. of cold water and the product extracted with pentane. The pentane solution was washed with water, dried over anhydrous sodium sulfate, filtered and the pentane evaporated under reduced pressure to leave 8.2 grams (82% yield) of a straw yellow liquid which partially crystallized on standing. A sample was recrystallized from pentane at dry ice temperatures to give a white solid, m.p. 33°–34°C.

The infrared spectrum of the product was in agreement with the structure of 1-t-butylazo-1-succinimidocyclohexane. The ten hour half-life in trichlorobenzene of this compound was determined as 140°C by the standard gas evolution technique.

At a 1.0 weight percent loading the 1-t-butylazo-1-succinimidocyclohexane cured the unsaturated polyester-styrene resin of Example II at 130°C giving a peak exotherm of 374°F (190°C) in 8.6 minutes and a hard cured resin.

The styrene polymerization efficiency ($F_1/F_2$) for 1-t-butylazo-1-succinimidocyclohexane at 115°C compared to di-t-butylperoxide was determined as 1.16 using the same procedure described in Example III.

EXAMPLE XI

Preparation of 2-t-Butylazo-2-succinimidopropane

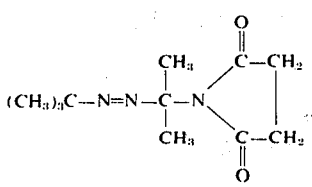

To a solution of 99.1 grams (1.0 moles) of succinimide in 200 mls. of dimethylformanide in a 2 liter jacketed reactor, was slowly added with rapid stirring 80 grams (1.0 moles) of 50% sodium hydroxide. After the addition was complete, the reaction mixture was stirred for 35 minutes at 30°C. The reaction mixture was warmed to 40°C and 162.5 grams (1.0 mole) of 2-t-butylazo-2-chloropropane added slowly over 20 minutes, holding the temperature at 40°–45°C. After the addition was complete, the reaction was stirred an additional 40 minutes at 40°–45°C, 700 ml. of cold water and 500 ml. of pentane added and the mixture stirred until the sodium chloride completely dissolved. The pentane solution was separated, washed with water, saturated $NaHCO_3$ solution, water, dried over anhydrous sodium sulfate, filtered and the pentane evaporated under reduced pressure to leave 146 grams (65% yield) of a straw yellow liquid which partially crystallized on standing. A sample was recrystallized from pentane at dry ice temperatures to give a white solid, m.p. 30°–33°C.

The infrared spectrum of the product was in agreement with the structure of 2-t-butylazo-2-succinimidopropane. The ten hour half-life in trichlorobenzene of this compound was determined as 135°C by the standard gas evolution technique.

At a 1.0 weight percent loading the 2-t-butylazo-2-succinimidopropane cured the unsaturated polyester-styrene resin of Example II at 130°C giving a peak exotherm of 451°F (233°C) in 8.3 minutes and a very hard cured resin.

The styrene polymerization efficiency ($F_1/F_2$) for 2-t-butylazo-2-succinimidopropane at 115°C compared to di-t-butylperoxide was determined as 0.82 using the same procedure described in Example III.

EXAMPLE XII

Preparation of n-Butyl 4-t-Butylazo-4-succinimidovalerate

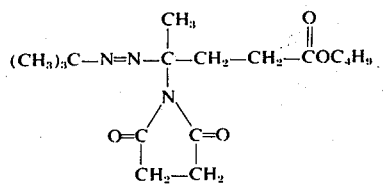

To a solution of 20.8 grams (0.21 moles) of succinimide in 80 mls. of dimethylformamide in a 300 ml. beaker, was slowly added with rapid stirring 16.0 grams (0.2 moles) of 50% sodium hydroxide. After the addition was complete, the reaction mixture was stirred an additional 30 minutes at room temperature. The reaction mixture was cooled to 20°C and 55.3 grams (0.2 moles) of n-butyl 4-t-butylazo-4-chlorovalerate was added dropwise at such a rate that the reaction temperature did not exceed 30°C. After the addition was complete, the reaction mixture was stirred an additional 60 minutes at room temperature, poured into 300ml. of cold water and the product extracted with pentane. The pentane solution was washed with cold water, 5%

HCl, water, saturated NaHCO₃ solution, dried over anhydrous sodium sulfate, filtered and the pentane evaporated under reduced pressure to leave 48.7 grams (72% yield) of a yellow liquid.

The infrared spectrum of the product was in agreement with the structure of n-butyl 4-t-butylazo-4-succinimidovalerate.

EXAMPLE XIII

Preparation of 4-t-Butylazo-4-succinimidovaleric Acid

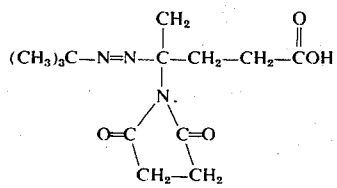

To a room temperature solution of 11.6 grams (.145 moles) of 50% sodium hydroxide in 100 ml. of methanol was added 48.7 grams (0.144 moles) of n-butyl 4-t-butylazo-4-succinimidovalerate (from Example XII) and the solution stirred for 2 hours at room temperature. At the end of the stirring period, the reaction mixture was poured into 500 ml. of water and extracted with 100 ml. of pentane (to remove any unsaponified ester). The pentane layer was discarded and the aqueous solution was acidified with hydrochloric acid to a pH of 4. The aqueous layer was then extracted with 100 ml. of methylene chloride, the methylene chloride layer separated, washed with water, dried over anhydrous sodium sulfate, filtered and the methylene chloride evaporated under reduced pressure to leave 9.0 grams (22% yield) of a straw yellow liquid.

The infrared spectrum of the product was in agreement with the structure of 4-t-butylazo-4-succinimidovaleric acid.

At a 1.0 weight percent loading the 4-t-butylazo-4-succinimidovaleric acid cured the unsaturated polyesterstyrene resin of Example II at 130°C giving a peak exotherm of 433°F (223°C) in 3.5 minutes and a very hard cured resin.

EXAMPLE XIV

Preparation of 2-t-Butylazo-2-(Δ4-tetrahydrophthalimido)propane

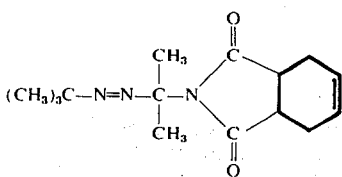

To a solution of 5.75 grams (.038 moles) of cis-Δ4-tetrahydrophthalimide in 60 mls. of dimethylformamide in a 200 ml. beaker, was slowly added with rapid stirring 2.96 grams (0.037 moles) of 50% sodium hydroxide. After the addition was complete, the reaction mixture was stirred for 40 minutes at 30° to 35°C. Then 5.87 grams (.0361 moles) of 2-t-butylazo-2-chloropropane was added dropwise over a 15 minute period holding the temperature at 35° to 40°C. After the addition was complete, the reaction mixture was stirred an additional 60 minutes at 35°C, poured into 200 ml. of water and the product extracted with pentane. The pentane solution was washed with cold water, saturated NaHCO₃ solution, dried over anhydrous sodium sulfate, filtered and the pentane evaporated under reduced pressure to leave 4.7 grams (47% yield) of a yellow liquid. The infrared spectrum of the product was in agreement with the structure of 2-t-butylazo-2-(Δ4-tetrahydrophthalimido)propane.

At a 1.0 weight percent loading the 2-t-butylazo-2-(Δ4-tetrahydrophthalimido)propane cured the unsaturated polyesterstyrene resin of Example II at 130°C giving a peak exotherm of 432°F (222°C) in 7.6 minutes and a very hard cured resin.

EXAMPLE XV

Preparation of 2-t-Butylazo-2-(4-amino-1,8-naphthalimido)propane

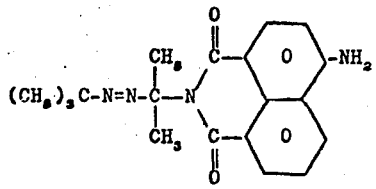

The 2-t-butylazo-2-(4-amino-1,8-naphthalimido)propane was prepared in 30% yield using the same procedure described in Example XIV, substituting 4-amino-1,8-naphthalimide for the cis-Δ4-tetrahydrophthalimide.

At a 1.0 weight percent loading the 2-t-butylazo-2-(4-amino-1,8-naphthalimido)propane cured the unsaturated polyester-styrene resin of Example II at 130°C giving a peak exotherm of 396°F (202°C) in 3.3 minutes and a very hard cured resin.

EXAMPLE XVI

Preparation of 2-t-Butylazo-2-maleimidopropane

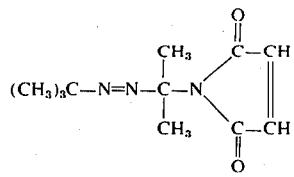

The 2-t-butylazo-2-maleimidopropane was prepared in 20% yield using the same procedure described in Example XIV, substituting maleimide for the cis-Δ4-tetrahydrophthalimide.

At a 1.0 weight percent loading the 2-t-butylazo-2-maleimidopropane cured the unsaturated polyester-styrene resin of Example II at 130°C giving a peak exotherm of 348°F (176°C) in 5.9 minutes and a very hard cured resin.

EXAMPLE XVII

Preparation of 2-t-Butylazo-2-(3,3-dimethylglutarimido)propane

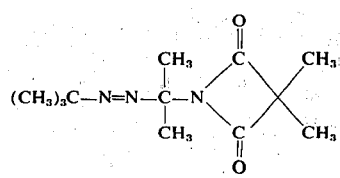

The 2-t-butylazo-2-(3,3-dimethylglutarimido)propane was prepared in 45% yield using the same procedure described in Example XIV, substituting 3,3-dimethylglutarimide for the cis-Δ4-tetrahydrophthalimide.

At a 1.0 weight percent loading the 2-t-butylazo-2-(3,3-dimethylglutarimido)propane cured the unsaturated polyester-styrene resin of Example II at 130°C giving a peak exotherm of 409°F (209°C) in 4.4 minutes and a very hard cured resin.

EXAMPLE XVIII

Preparation of
2-t-Butylazo-2-(1,2-cyclohexanedicarboximido)propane

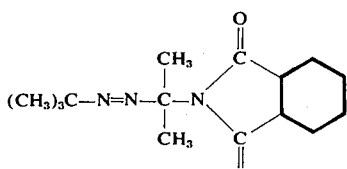

The 2-t-butylazo-2-(1,2-cyclohexanedicarboximido)propane was prepared in 40% yield using the same procedure described in Example XIV, substituting cis-1,2-cyclohexanedicarboximide for the cis-Δ4-tetrahydrophthalimide.

At a 1.0 weight percent loading the 2-t-butylazo-2-(1,2-cyclohexanedicarboximido)propane cured the unsaturated polyester-styrene resin of Example II at 130°C giving a peak exotherm of 425°F (218°C) in 5.5 minutes and a very hard cured resin.

EXAMPLE XIX

Preparation of
2-t-Butylazo-2-(1,8-naphthalimido)propane

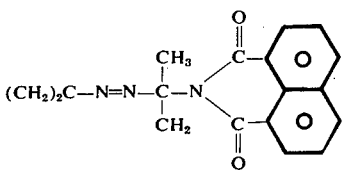

The 2-t-butylazo-2-(1,8-naphthalimido)propane was prepared in 15% yield using the same procedure described in Example XIV substituting 1,8-naphthalimide for the cis-Δ4-tetrahydrophthalimide.

At a 1.0 weight percent loading the 2-t-butylazo-2-(1,8-naphthalimido)propane cured the unsaturated polyester-styrene resin of Example II at 130°C giving a peak exotherm of 390°F (199°C) in 3.1 minutes and a very hard cured resin.

What is claimed is:

1. In a process for the homo- or copolymerization of ethylenically unsaturated monomers which are responsive at suitable temperatures to free radical generators as polymerization initiators, the improvement which comprises employing as the free radical generator a t-aliphatic α-(imido)azo compound of the formula:

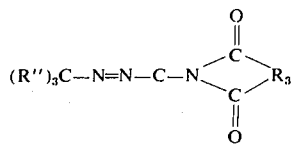

wherein:

$(R'')_3C$ is a tertiary $C_4$-$C_{20}$ alkyl, cycloalkyl, alkylcycloalkyl, arylcycloalkyl or aralky group wherein each $R''$ is separately selected from $C_1$-$C_8$ alkyl, $C_7$-$C_{12}$ aralkyl and $C_6$-$C_{14}$ aryl, not more than one $R''$ being aromatic, and 2 or 3 of said $R''$s can join with the tertiary carbon atom to form a cyclo-, bicyclo-, or tricyclo-alkyl radical of 3–12 carbons;

$R_1$ and $R_2$ are separately selected from $C_1$-$C_8$ alkyl, $C_3$-$C_{12}$ cyclo-, bicyclo- or tricycloalkyl, $C_7$-$C_{12}$ aralkyl and 5–6 membered heterocyclic wherein the hetero atom is selected from oxygen or nitrogen, $R_1$ can also be $C_6$-$C_{14}$ aryl, $R_1$ and $R_2$ taken together can form a $C_3$-$C_{11}$ alkylene diradical, and one or more of each $R_1$ and $R_2$ can be substituted with lower alkoxy, hydroxy, carboxy, lower alkoxycarbonyl, lower acyloxy, halo, cyano, amido or lower alkylsulfonato; and $R_3$ is $C_2$-$C_{10}$ alkylene or alkenylene; $C_3$-$C_{10}$ cycloalkenylene, cyclo- or bicycloalkylene or substituted cyclo- or bicycloalkylene; or $C_6$-$C_{14}$ arylene or substituted arylene; the $R_3$ substituents being selected from lower alkyl, amino, halo, cyano and sulfo.

2. A process as in claim 1 wherein the monomer is styrene and the polymerization temperature is in the range of about 100°–115°C.

3. A process as in claim 2 wherein compound I is 2-t-butylazo-2-phthalimido-4-methylpentane.

4. A process as in claim 2 wherein compound I is 2-t-butylazo-2-phthalimido-4-methoxy-4-methylpentane.

5. In a process for curing an unsaturated polyester resin composition in the presence of a free radical polymerization initiator, the improvement which comprises employing as said initiator a t-aliphatic a-(imido) azo compound of the formula:

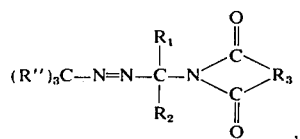

wherein:

$(R'')_3C$ is a tertiary $C_4$-$C_{20}$ alkyl, cycloalkyl, alkylcycloalkyl, arylcycloalkyl or aralkyl group wherein each $R''$ is separately selected from $C_1$-$C_8$ alkyl, $C_7$-$C_{12}$ aralkyl and $C_6$-$C_{14}$ aryl, not more than one $R''$ being aromatic, and 2 or 3 of said $R''$s can join with the tertiary carbon atom to form a cyclo-, bicyclo-, or tricyclo-alkyl radical of 3–12 carbons:

$R_1$ and $R_2$ are separately selected from $C_1$-$C_8$ alkyl, $C_3$-$C_{12}$ cyclo, bicyclo-, or tricycloalkyl, $C_7$-$C_{12}$ aralkyl and 5–6 membered heterocyclic wherein the hetero atom is selected from oxygen or nitrogen, $R_1$ can also be $C_6$-$C_{14}$ aryl, $R_1$ and $R_2$ taken together can form a $C_3$-$C_{11}$ alkylene diradical, and one or more of each of $R_1$ and $R_2$ can be substituted with lower alkoxy, hydroxy, carboxy, lower alkoxycarbonyl, lower acyloxy, halo, cyano, amido or lower alkylsulfonato; and $R_3$ is $C_2$–$C_{10}$ alkylene or alkenylene; $C_3$–$C_{10}$ cycloalkenylene, cyclo- or bicycloalkylene or substituted cyclo- or bicycloalkylene; or $C_6$–$C_{14}$ arylene or substituted arylene; the R3 substituents being selected from lower alkyl, amino, halo, cyano and sulfo.

6. A process as in claim 5 wherein said composition comprises (a) the esterification product of propylene glycol, maleic anhydride and phthalic anhydride in admixture with (b) monomeric styrene, and the curing temperature is in the range of about 100° – 130°C.

7. A process as in claim 5 wherein compound I is 2-t-butylazo-2-phthalimido-4-methylpentane.

* * * * *